March 24, 1925. 1,531,015
H. MAINE
WIND POWER ENGINE
Filed Sept. 21, 1923  2 Sheets-Sheet 1
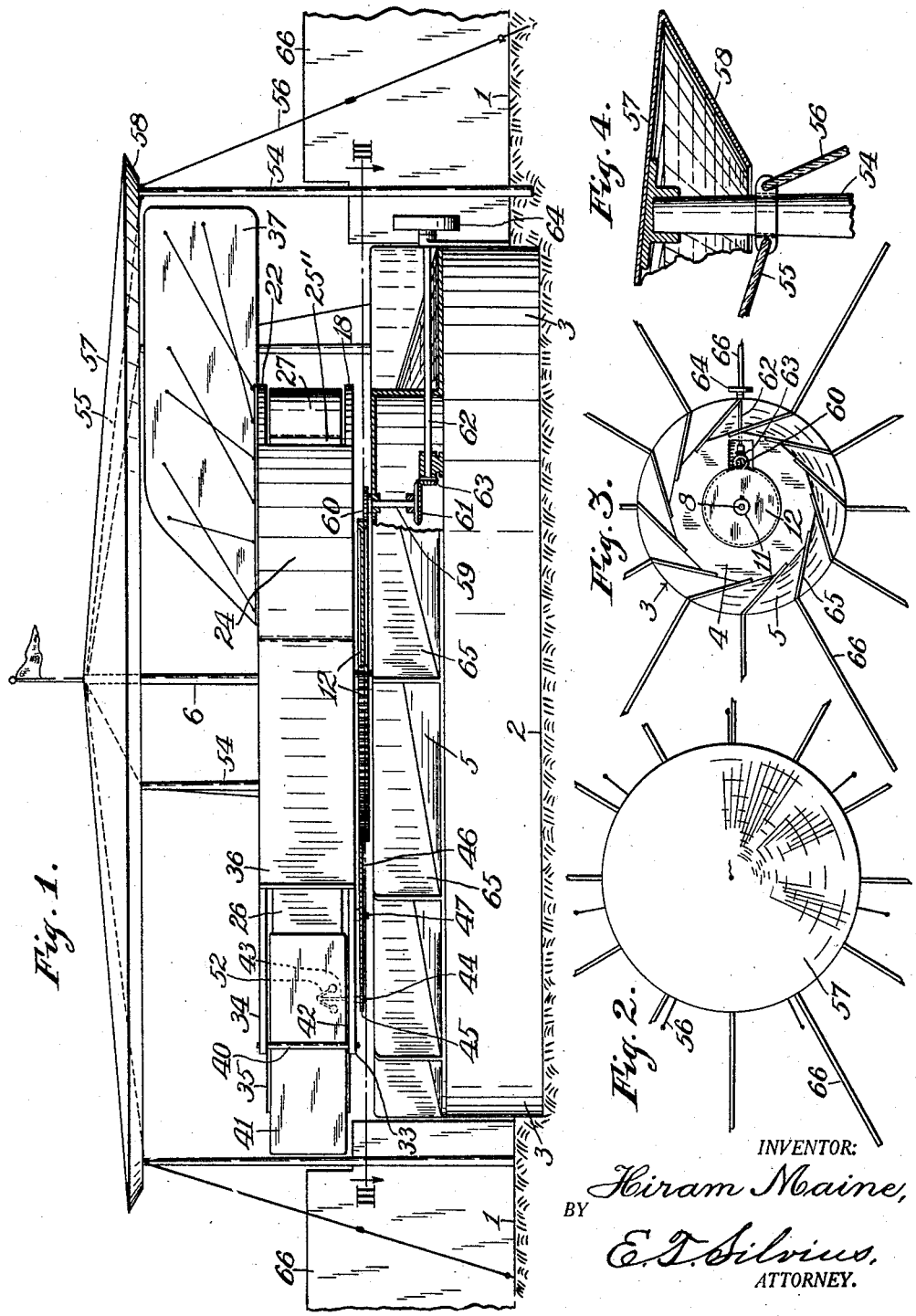
INVENTOR:
Hiram Maine,
BY
E. T. Silvius,
ATTORNEY.

March 24, 1925.
H. MAINE
WIND POWER ENGINE
Filed Sept. 21, 1923    2 Sheets-Sheet 2
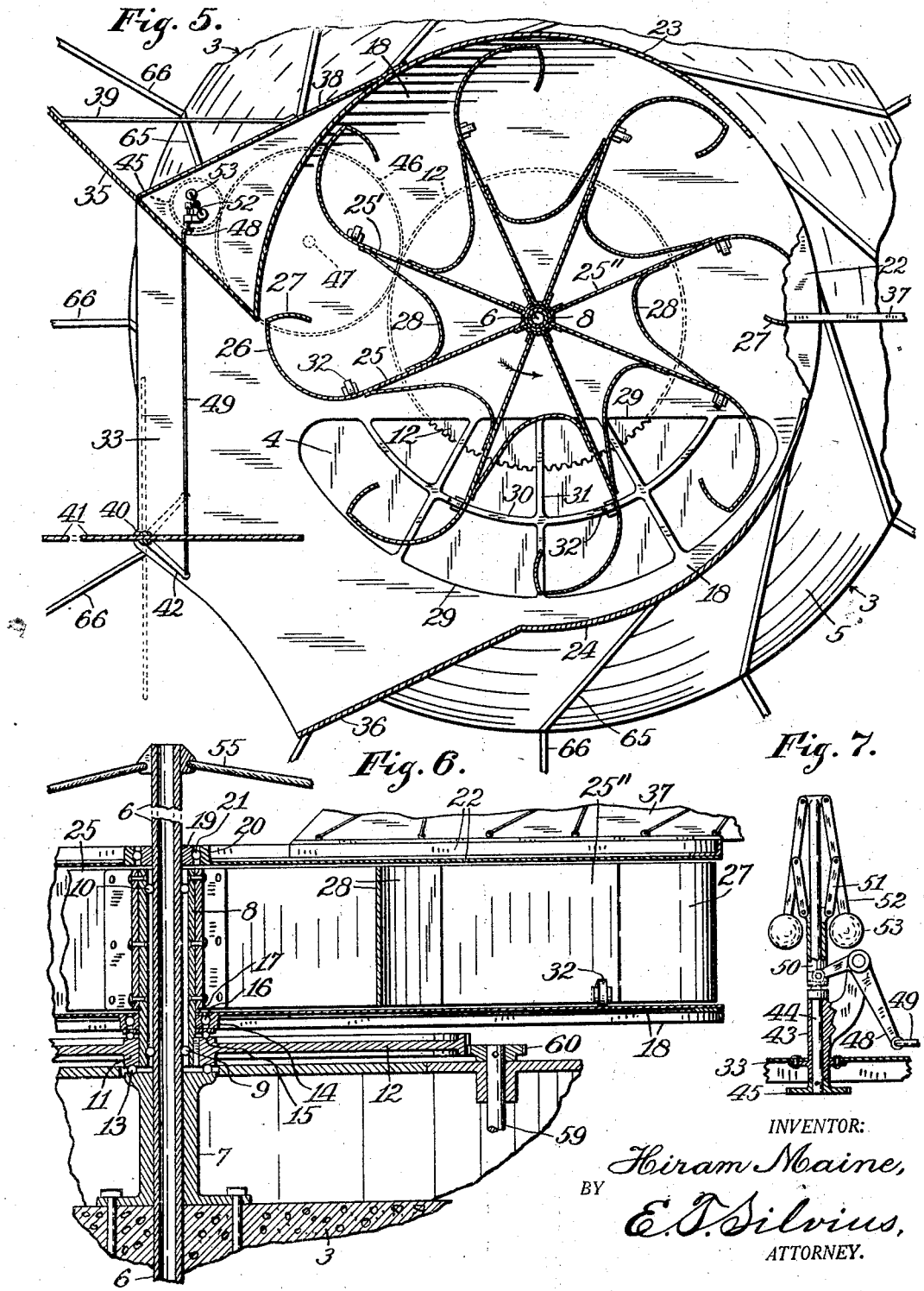
INVENTOR:
Hiram Maine,
BY
E. T. Silvius,
ATTORNEY.

Patented Mar. 24, 1925.

1,531,015

UNITED STATES PATENT OFFICE.

HIRAM MAINE, OF INDIANAPOLIS, INDIANA.

WIND-POWER ENGINE.

Application filed September 21, 1923. Serial No. 664,106.

*To all whom it may concern:*

Be it known that I, HIRAM MAINE, a citizen of the United States, residing at Indianapolis, in the county of Marion and State of Indiana, have invented a new and useful Wind-Power Engine, of which the following is a specification, reference being had to the accompanying drawings and to the letters and figures of reference marked thereon.

This invention relates to a wind-power engine that is designed for developing very high power for industrial or other purposes, and has reference more particularly to the type of wind-power engine that may be controlled to prevent its being driven during wind storms at such high speed as possibly to endanger the machinery thereof, or machinery driven thereby, the invention being of the type that has a wind-wheel arranged to rotate on a vertical axis.

An object of the invention is to provide a mammoth wind-power engine, and of such construction as to be adapted to be actuated so as to generate high power, and transmit motion with sufficient speed for useful purposes even when driven by wind currents of low velocity.

Another object is to provide a wind-power engine which shall be so constructed as to control air currents for its operations in the most effective manner, and particularly so that the pressure of air currents shall act principally at and near the ends of extremely long wind-wheel wings and on the maximum number of wings of a wind-wheel, to obtain enormous leverage, especially when the pressure of air currents is limited.

A further object is to provide a wind-power engine, including air current controllers, which shall be of such construction as to utilize air currents from a wide area to obtain large volume and direct the currents most effectively to the greatest available portion possible of a wind-wheel, whereby to enable the wind-wheel to develop the highest possible degree of power and steady continuous motion.

A still further object is to provide a wind-power engine for high power duty which shall be capable of operation under adverse atmospheric conditions that might be due to storms, such as snow or sleet; which engine shall not be liable to become damaged in operation nor subject to derangement resulting from changing atmospheric conditions, but which shall be strong and efficient, and durable and economical in use.

With the above-mentioned and other objects in view, the invention consists in a wind-power engine of novel construction adapted more particularly for driving machinery and especially for driving electric generators, the invention consisting further in various structural features comprised in wind-wheels and supporting means therefor, and also means for effectively directing air currents to the wind-wheels; and the invention still further consists in the parts and combinations and arrangements of parts as hereinafter particularly described and further defined in the claims appended hereto.

Referring to the drawings,—Figure 1 is an elevation of the wind-power engine in which the general arrangement of parts thereof may be seen, other parts normally in the foreground being omitted to avoid obscuring essential features; Fig. 2 is a top plan on a reduced scale of the wind-power engine as preferably constructed; Fig. 3 is a top plan of the supporting base of the wind-power engine, being a horizontal section approximately on the line III—III in Fig. 1, on a reduced scale; Fig. 4 is a fragmentary detail of associated parts of the protecting structure of the engine, on an enlarged scale; Fig. 5 is a horizontal section of the engine on a plane through the wind-wheel thereof, showing a plan of the bottom of the wind-wheel casing and also the top of the base of the engine, as preferably constructed; Fig. 6 is a fragmentary vertical section of the engine, on an enlarged scale, showing particularly a means whereby motion is transmitted by the wind-wheel; and, Fig. 7 is an elevation, partially in section illustrating a type of governor suitable as a medium for controlling the flow of air into the wind-wheel casing.

Similar reference characters in the different figures of the drawings indicate corresponding elements or features of construction herein referred to in detail.

In practically carrying out the objects of the invention, a suitable location is selected, preferably on high ground, the numeral 1 indicating the ground level and 2 the bottom of an excavation in which a suitable base 3 is erected, the base preferably being circular and monolithic composed of concrete or masonry work. The base in some cases is extremely large either in diameter or height, or both, as may be determined in calculating for certain performance or requirements. The base has a central top portion 4 that preferably is flat, the remaining top portion 5 of the base being conically inclined or slanting so as to deflect air currents upward. A center shaft 6, which preferably is hollow, is firmly secured to and supported by the base 3 in vertical arrangement, being central on the base, and a suitable center bearing block 7 is supported upon the base and extends about the shaft, being practically a part of the shaft. A suitable wind-wheel hub 8 is arranged on the center shaft and provided with suitable anti-friction bearings 9 and 10 enabling the shaft to rotatably guide the hub, the weight of the hub being sustained by any suitable means; as shown, the hub 11 of a gear wheel 12 being secured rigidly to the hub 8 and supported upon the bearing block 7 by a suitable anti-friction bearing 13. A wind-wheel casing preferably comprises a lower hub 14 supported by means of a suitable anti-friction bearing 15 upon the hub 11, the hub 14 having an anti-friction bearing 16 therein operating in connection with a bearing collar 17 secured on the hub 8 to rotatably guide the casing hub on the wind-wheel hub. The casing has a bottom 18 that is secured to the hub 14. A bearing collar 19 is fixed to the center shaft 6 above the hub 8, and an upper casing hub 20 is suitably guided to rotate thereon, preferably being provided with an anti-friction bearing 21, and a casing top 22 is fixed to the hub 20. The casing comprises also a curved side wall 23 of suitable length and an opposite curved side wall 24 which preferably is shorter than the other wall and preferably set out farther than the wall 23 from the axis of rotation of the hub 8, both walls being secured to the bottom and the top of the casing, the spaces between the ends of the walls being for the passage of air currents through the casing. The wind-wheel has a suitable number of wings or blades 25, 25', 25'', each wing being secured to the hub 8 and having a curved portion 26 extending around circumferentially towards the convex portion of the next adjacent wing that normally follows during operation, and the end of the portion 26 has a wing section 27 fixed thereto that extends inward towards the hub 8, a pocket thus being formed behind the wing section to retain the air currents on the ends of the wings as they are carried to the outlet-opening in the casing. Suitable braces are arranged between the wings of the wind-wheel and each preferably comprises a curved partitional wall 28 secured to two contiguous wings at a suitable distance from the hub 8 to exclude air currents from the inner portions of the wings adjacent to the hub. The wind-wheel being very large in diameter and the wings thereof being very long, the force of the air currents is applied most efficiently on the ends of the wings and adjacently to the ends. The bottom 18 of the casing has an aperture 29 therein that is located on one side of the axis of rotation of the casing and in proximity to the wall 24, and the bottom preferably has a curved track rail portion 30 extending across the aperture concentrically to the hub 8, the rail being supported by radial beams 31 extending across the aperture. Each wing preferably is provided with a supporting wheel or roller 32 arranged to roll upon the casing bottom 18 and along the rail 30, to assist in supporting the wing. The casing bottom has an extension 33 and the casing top has an extension 34 constituting parts of a mouth leading to the inlet-opening of the casing. A side wall plate 35 is connected to the parts 33 and 34 and to the end of the wall 23 to constitute one side of the inlet-opening, the wall 35 extending outward at an acute angle with respect to the wall 23, to deflect air currents obliquely into the inlet-opening and across the aperture 29 in the casing bottom. An opposite side wall plate 36 is connected also to the parts 33 and 34 and to the end of the wall 24 that constitutes the opposite side of the inlet-opening to deflect air currents to the wings of the wind-wheel as they pass across the aperture 29, the wall 24 being located considerably beyond the ends of the wings to permit atmospheric air to pass the end of one wing to the end of another receding wing. A tail vane 37 is secured to the top 22 of the wind-wheel casing and is of suitable proportion to enable air currents to hold the rotary casing so that the mouth thereof shall face the air current at all times. A wall plate 38 is secured to the wall 23 and extends tangentially therefrom to the wall plate 35 and is secured thereto and also to the parts 33 and 34, to conveniently form a chamber for a governor. Preferably a brace 39 is secured to the plates 35 and 38.

In order to regulate the speed of the wind-wheel as wind velocity changes, and more particularly to limit the speed of the wind-wheel to a safe rate during severe wind storms, the air currents to the casing are in a measure controlled and modified by suitable means which preferably comprises a vertical shaft 40 rotatably supported by the mouth parts 33 and 34, a regulator shutter 41 secured between its ends to the shaft, being aranged between the parts 33 and 34, and a lever arm 42 secured to the shaft. A suitable governor is provided which comprises a stand 43 that is secured to the part 33 and rotatably supports a vertical shaft 44 to which a pinion 45 is secured below the part 33, the pinion being in mesh with a transmission gear wheel 46 arranged below the casing bottom and rotatably supported on a stud 47 carried by the casing bottom, the wheel 46 being in mesh with the upper portion of the gear wheel 12. The stand 43 pivotally supports a bell-crank 48, and a connecting rod 49 is connected to one arm of the bell-crank and also to the arm 42 to control the shutter. The remaining arm of the bell crank is operated and controlled by means of a sleeve 50 suitably arranged on the shaft 44 and having links 51 connected thereto that are connected to arms 52 that are pivoted to the shaft 44, and provided each with a weight 53, the governor acting when operated in a well known manner.

Preferably the center shaft 6 is sufficiently tall to extend higher than the guiding vane 37 and is stayed by means of posts 54 supported by the ground about the base 3, cables or rods 55 connected to the shaft and also to the posts, and cables 56 connected to the posts and anchored in the ground. Preferably the wind-power engine includes a protecting roof 57 which is supported upon the center shaft 6 and the posts 54. In some cases the edge of the roof has an annular deflector 58 fixed thereto that extends downwardly and inwardly at a suitable angle to deflect air currents downward towards the mouth of the wind-wheel casing, so as to obtain the maximum benefit of passing air currents to drive the wind-wheel most efficiently.

For transmitting motion and power from the wind-wheel a shaft 59 is suitably supported rotatably in the upper portion of the base 3 and it has a pinion 60 secured thereto that meshes with the lower portion of the gear wheel 12 so as to not interfere with the gear wheel 46, and a bevel gear wheel 61 is secured to the lower portion of the shaft 59. A shaft 62 is suitably supported rotatably and horizontally by the base 3 and has a bevel pinion 63 secured thereto that is in mesh with the wheel 61, the shaft extending out beyond the base and having a suitable driving wheel 64 thereon for transmitting the motion and developed power in any desired or suitable manner.

For the purpose of deflecting the air currents passing over the inclined top portion 5 of the base towards and through the aperture 29 in the casing bottom, so as to be effective on the wind-wheel wings, the inclined top portion 5 has a suitable number of upright deflectors 65 fixed thereon that are arranged so as to guide the air currents inward over the inclined portions, the space between the ends of the deflectors below the casing being contracted so as to cause slight compression and increased velocity of the air passing towards the wings of the wind-wheel.

Preferably the engine is provided with feeders in the form of long fence-like deflectors 66 that extend from the outer ends of the deflectors 65 and are securely supported upon the ground, being radially arranged so that considerable atmospheric air regardless of the direction from which it may be blowing, shall always be directed toward the engine, particularly to the inclined top of the base and into the mouth of the wind-wheel casing, thus assuring large volumes of flowing air and maximum pressure to rotate the wind-wheel.

In practical use, the regulator shutter 41 normally stands so as to permit free flow of atmospheric air into the mouth of the wind-wheel casing, being so held because of the gravity-acting arms 52 of the governor. The governor arms may be manually spread out for causing the shutter to cut off or nearly cross the mouth of the casing if it is desired to arbitrarily stop the engine. As the direct air current enters the casing mouth it fills the pockets in the wind-wheel on one side of the axis thereof, being excluded from the wings on the opposite side of the axis by the shielding casing wall 23; but some of the air is directed by the side wall 35 obliquely into the inlet-opening in the casing so as to forcibly flow against the wing sections 27 as they pass the inner end of the wall 35, the force of the air current thus being directed against the extreme end portion of the wings. The force of the wind is further directed against the wings of the wind-wheel by the deflecting wall 36 and the curved wall 24, the latter confining the flowing air to the wings until the wings pass around to the outlet opening in the casing wall that is opposite to the inlet-opening, the wind force thus being applied to the wind-wheel on approximately one-half of its circumferential portion, and the applied force is augmented by the lower air currents directed over the base of the engine and flowing upward through the aperture in the casing bottom to the lower portions of the wings. The field from which the flowing air may be drawn and directed to the wind-wheel being very large, the maximum development of power by the engine is assured. As the casing is turned on its axis by changes of direction of the wing acting on the tail vane, the transmission wheel 46 is carried around the gear 12, so as to be constantly rotated, and with low velocity of the wind-wheel the governor permits the regulator shutter 41 to rest in normal position. In case of undesirably high speed being attained by the wind-wheel, or to prevent high velocity of wind during severe storms from rotating the wind-wheel at an objectionably high speed, the increasing speed causes the governor arms to spread out and draw up the sleeve 50 which actuates the bell-crank 48 to pull the shutter around so as to more or less cut off the air currents from the mouth of the casing and thus reduce the force of the wind on the wind-wheel.

What is claimed as new is:—

1. A wind-power engine including a stationary base having a conical top portion, a casing rotatably mounted on the base and comprising a bottom having an aperture on one side of the axis of rotation thereof, and a wind-wheel rotatable in the casing.

2. A wind-power engine including a stationary base, a casing rotatable on the base and having a flared current-deflecting inlet mouth, the casing comprising a bottom having an inlet aperture on one side of the axis of rotation thereof, and a wind-wheel rotatable in the casing and having pockets to be carried over the inlet aperture.

3. A wind-power engine including a stationary base, a casing rotatable on the base and having a flared current-deflecting inlet mouth and an outlet-opening, a wind-wheel rotatable in the casing, a vane secured upon the top of the casing adjacent to the outlet-opening, a regulator shutter pivotally supported between opposite ends thereof in the outer portion of the inlet mouth, and means to control the shutter.

4. A wind-power engine including a fixed base and a wind-wheel rotatably mounted thereon with a vertical axis of rotation, the base having a conical top and deflectors thereon to deflect air-currents about the axis of rotation and upward to the wind-wheel, and a casing for the wind-wheel having means to direct air-currents horizontally to the wind-wheel.

5. A wind-power engine including a stationary base having mammoth proportions, a plurality of stationary deflectors radially arranged about the base in connection therewith and being bodily supported separately from the base, a casing rotatable upon the base with a vertical axis of rotation, and a wind-wheel rotatable in the casing and having support upon the base and also upon the bottom of the casing.

6. A wind-power engine including a casing and a wind-wheel therein rotatable independently with a vertical axis of rotation, the wind-wheel comprising radial wings and partitions arranged between the wings and opposite to the axis of rotation, one end of each partition being secured to the adjacent wing at a material distance from said axis, the opposite end of the partition being secured to the next adjacent opposite wing at a relatively greater distance from said axis, the wings being curved beyond the partitions and extending in return order towards the partitions.

7. A wind-power engine including a fixed base and a wind-wheel rotatably mounted thereon with a vertical axis of rotation, the base having a conical top and deflectors thereon to deflect air-currents upward to the wind-wheel and about one side of its axis of rotation, and a casing for the wind-wheel having means to direct air-currents horizontally to the wind-wheel and towards said side of its axis of rotation.

8. A wind-power engine including a casing with an inlet-opening in one side thereof, and a wind-wheel rotatable in the casing and comprising a plurality of wings having curved portions respectively adjacent to the end thereof, and curved partitions secured to the wings, each partition extending between two immediately adjacent wings and being secured thereto adjacent to the curved portions thereof, the concave side of each partition facing outwardly.

9. A wind-power engine including a rotatable casing having an inlet-opening in one side and an outlet-opening in the opposite side thereof, the inlet opening having a flared mouth, a vane secured to the top of the casing adjacent to and above the outlet-opening therein, a wind-wheel rotatable in the casing, a regulator shutter movably supported in the mouth of the inlet-opening, and actuating and controlling means for the shutter including a governor carried on the casing and having connection with the shutter and with the wind-wheel to be driven by the latter.

10. A wind-power engine including a stationary base having a conically-inclined top portion, a casing rotatably supported by the base and having on one side thereof a protruding inlet mouth, a wind-wheel rotatably supported in the casing, a train of transmission gearing connected with the wind-wheel, the wind-wheel being driven by air-currents received through the inlet mouth, a vane fixedly secured to the top of the casing, and a series of means connected to the base for gathering atmospheric air remotely distant from the base and directing currents of air to the inlet mouth.

11. A wind-power engine including a mammoth immovable base and a series of air-deflecting fences radially arranged about the base and connected therewith, a casing rotatably supported by the base and comprising a bottom plate and a top plate and also a side wall having an inlet-mouth and an outlet-opening, a wind-wheel rotatably supported in the casing and comprising constantly radial wings, each wing having a capacious pocket adjacent to the end thereof and a wheel adjacent to the pocket to roll upon the bottom of the casing, and a shutter pivotally supported between opposite ends thereof in the inlet-mouth.

12. A wind-power engine including a stationary monolithic base having a conically-inclined top portion, a center shaft vertically supported upon the base, a casing and a wind-wheel therein supported upon the base and rotatably guided on the center shaft, the casing having an inlet-opening and an outlet-opening, a vane secured to the casing adjacent to the outlet-opening, a series of posts supported outward beyond the base, and a series of stays connected to the posts and the center shaft.

13. A wind-power engine including a stationary base, a center shaft vertically supported by the base, a wind-wheel having a hub rotatably guided by the center shaft, a gear wheel hub fixed to the wind-wheel hub and rotatably supported by the base, a toothed wheel fixed to the gear wheel hub, a casing for the wind-wheel having a hub rotatably guided by the wind-wheel hub and supported upon the gear wheel hub, and a train of gearing supported by the base and having connection with the toothed wheel.

14. A wind-power engine including a stationary monolithic base, a center shaft vertically supported upon the base, a casing and a wind-wheel therein supported upon the base and rotatably guided on the center shaft, the casing having a current-deflecting mouth and an outlet-opening, a vane secured to the casing adjacent to the outlet-opening, a series of posts supported outward beyond the base, and a roof supported upon the center shaft and the posts, the edge of the roof having an annular deflector secured thereto that extends downwardly and inwardly to deflect air-currents to the mouth of the casing.

15. In a wind-power engine, the combination of a stationary externally circular base having a conically-inclined annular marginal top portion and deflectors extending upward from the top portion, each deflector extending also from the lower to the upper edge of said top portion towards one of the next adjacent deflectors, a wind-wheel rotatably mounted upon the central portion of said base, and a casing rotatable about the wind-wheel and having a flaring inlet mouth in its side and an aperture in its bottom to receive air-currents from above the conical top portion of said base.

16. In a wind-power engine, the combination with a stationary base, of a wind-wheel hub rotatably mounted upon the base, a casing having a hub rotatably guided by the wind-wheel hub, the casing including a horizontal bottom having an aperture therein on one side of the casing hub and a curved track rail extending across the aperture concentrically to the hub, and a plurality of wings secured to the wind-wheel hub and extending outwardly above said bottom, each wing being provided with a supporting wheel to roll upon said bottom and said rail alternately.

In testimony whereof, I affix my signature on the 19th day of September, 1923.

HIRAM MAINE.